United States Patent

[11] 3,547,176

| [72] | Inventors | Arne Kroken;<br>Egil Hyggen, Oslo, Norway |
|---|---|---|
| [21] | Appl. No. | 763,339 |
| [22] | Filed | Sept. 27, 1968 |
| [45] | Patented | Dec. 15, 1970 |
| [73] | Assignee | Christiania Spigerverk<br>Oslo, Norway |
| [32] | Priority | Oct. 4, 1967 |
| [33] | | Norway |
| [31] | | No. 167,834 |

[54] TIRE TRACTION DEVICE
6 Claims, 4 Drawing Figs.

| [52] | U.S. Cl. | 152/218 |
|---|---|---|
| [51] | Int. Cl. | B60c 27/02 |
| [50] | Field of Search | 152/213, 218, 225—233 |

[56] References Cited
UNITED STATES PATENTS

| 2,910,105 | 10/1959 | Binegar | 152/225 |
|---|---|---|---|
| 3,053,302 | 9/1962 | Bopst | 152/226 |

*Primary Examiner*—Arthur L. La Point
*Attorney*—Young and Thompson

ABSTRACT: A device for fitting and fixing gripping shoes on vehicle wheels, in which four gripping shoes are fitted at the one end of their respective bars, which bars, after being fitted onto the wheel form a cross, and the other ends of which are toothed and are slidably suspended in their longitudinal directions relative to a housing centrally situated with respect to the wheel and movable with the help of a gear wheel, rotatable in the housing, which engages with the teeth on the arms and which is rotatable by means of an operating component which may be locked to one of the bars with the help of a locking component, wherein a resilient element is fitted between the locking device and the operating component.

INVENTORS
ARNE KROKEN
EGIL HYGGEN

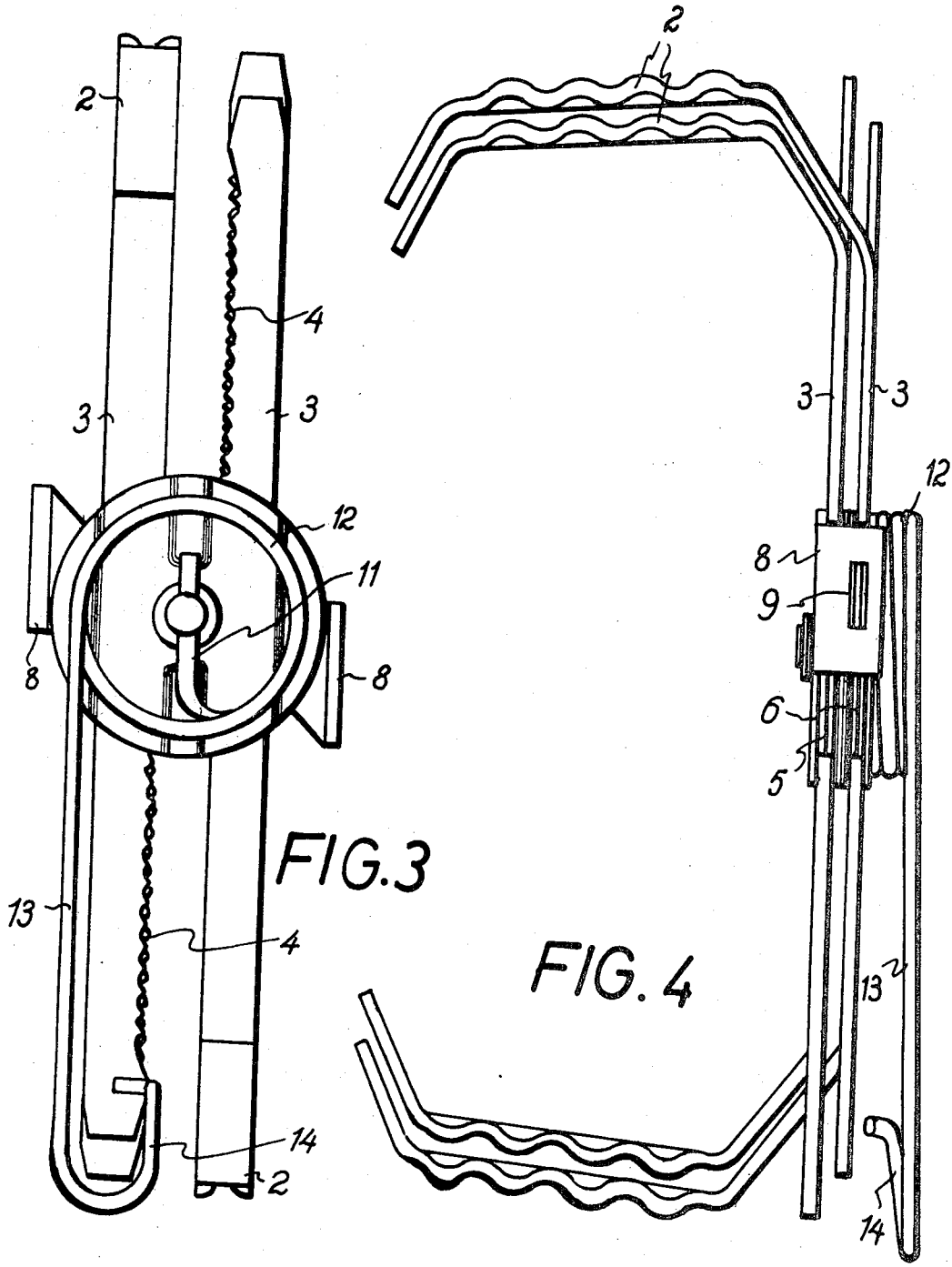

TIRE TRACTION DEVICE

This invention relates to a device for fitting and fixing gripping shoes on vehicle wheels, in which four gripping shoes are fitted each at the one end of its respective bar, which bars, after having been fitted onto the wheel, form a cross, the other end of each bar being toothed and slidably suspended in its longitudinal direction in a housing centrally positioned with respect to the wheel, and movable with the help of a gear wheel rotatably suspended in the housing, which gear wheel engages with the teeth in the arms and may be rotated with the help of an operating component.

With devices of this kind it proves, however, that the device, in spite of it having been tightened with the help of the operating component and also perhaps by securing a locking mechanism when fitting, can slip when on the wheel, probably because when the device is fitted none of the gripping shoes are on that part of the wheel which rests against the under surface, but when the wheel rotates with the result that a gripping shoe adopts a position between the wheel and the under surface, the tension, on account of the compression of the tyre, will be slackened with the result that the wheel slides inside the gripping shoes.

An object of this invention is to obviate this disadvantage and this is achieved according to the invention by there being fitted a spring element between the locking device and the rotatable part.

The operating component may, with advantage, be in the form of a spring which, from its point of connection with the rotating part, is in the form of a helical or spiral coil which turns into a tangential part which forms the operating component itself, and of which the end is shaped like a hook which, after the spring has been tightened is hooked onto one of the bars.

Further, from U.S. Pat. No. 2,754,874 a device of the type described in the introduction is known for permanent fixture on the wheel of a vehicle, in which use is made of four gripping shoes with four appertaining arms which form a cross and in which the gripping shoes are of a resilient material and, with the help of teeth on the arms and the gear wheel which can be operated by means of a hydraulic motor from the driver's seat of the vehicle, it can be moved radially between two terminal positions, namely a position in which the gripping shoes lie against the circumference of the wheel, that is to say in the working position and a position along side the wheel, that is to say out of the working position.

It is, however, not the intention of this invention that the shoes shall be permanently fixed on a wheel, but in a simple manner shall be able to be fitted and fixed on the wheel when there is a need for gripping shoes, that is to say on a slippery surface, and in a simple manner shall be able to be removed again when the vehicle has been brought out of the difficult situation without the driver soiling himself, whilst at the same time the device may easily be folded together so that it does not occupy too much storage space, for example in the boot of a car.

This is achieved, according to the invention, by the housing being divided into two parts mutually rotatable about the axis of the gear wheel, each half carrying the toothed portions of the two parallel-operated bars and by at least one half being fitted with at least one locking device in order to lock the two halves in a position in which the bars form a cross.

Preferably, the one half carries two locking devices in the form of lugs with openings through which the toothed ends of the two parallel-operated bars in the other half are threaded when tensioning the shoes against the wheel with the bars forming a cross.

An embodiment of the invention shall be explained in more detail with reference to the drawings.

FIG. 3 is a front view of the device in FIGS. 1 and 2 in the folded position.

FIG. 4 is a side view of the device in FIG. 3.

Figure 1:
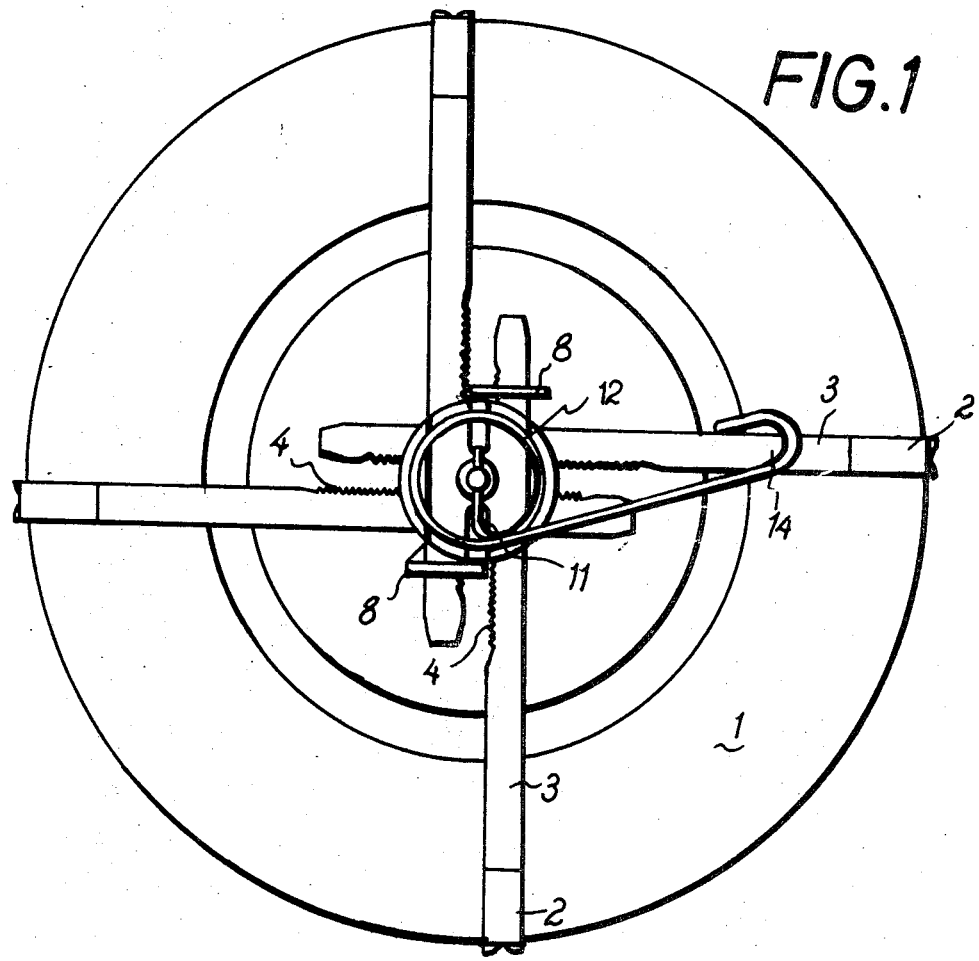
FIG. 1 shows a front view of a vehicle wheel on which four gripping shoes have been fitted with the help of a device according to the invention.
Figure 2:
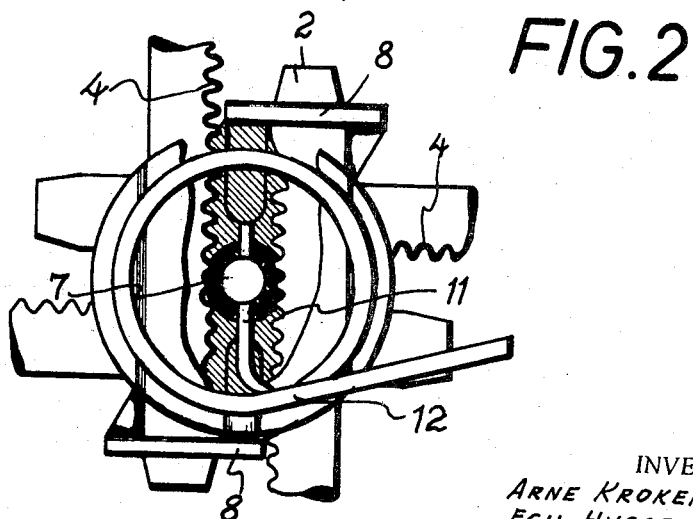
FIG. 2 shows, on a larger scale, and partly in section, a central detail of FIG. 1.

In FIG. 1, fitted onto a motor vehicle wheel 1 there are four gripping shoes 2 which form the outer ends of arms 3, the other ends of which carry teeth 4. The toothed arms may be slid in their longitudinal directions in guides in a central housing which is divided into two halves 5 and 6, which may be rotated about the axis of the gear wheel and each of which contains guides for two of the arms. The two halves 5 and 6 of the housing in FIG. 1 have been so rotated relative to one another that the arms slide parallel to one another in pairs which form a cross. In the center of the housing there is a gear wheel 7 which, on being rotated, can move the arms parallel to one another in each of the halves of the housing in order that the gripping shoes may be fitted over the circumference of the wheel 1 and then tightened into position around the wheel. In order to lock the arms in this cross shape, there are two lugs 8 on the housing which have openings 9 through which the two free ends of two of the arms can be inserted when tightening the shoes. For the rotation of the gear wheel 7, there is fitted to this the one end 11 of a spring which, from its point of connection with the gear wheel, is in the form of a helical coil 12 which continues as a tangential part 13 the free end of which is in the form of a hook 14 which after the spring has been tensioned, can be hooked against one of the arms 3. When the device is not in use it may, by rotating the two halves 5 and 6 of the housing with relationship to one another, be folded together to the position shown in FIGS. 3 and 4 whereby two of the arms after they have been moved so far out by rotating the gear wheel 7 that they release themselves from the locking devices 8, may be rotated until they lie parallel with the other two arms, after which all four arms, by means of rotation, can be drawn in again as far as the toothed parts allow, and the spring 11, 12, 13, 14 is tensioned and the hook part 14 is hooked over one of the arms in order to hold the complete assembly together.

We claim:

1. A device for fitting and fixing gripping shoes on vehicle wheels, in which four gripping shoes are fitted at the one end of respective bars, which bars, after being fitted onto the wheel, form a cross, and the other ends of which bars are toothed and are slidably suspended in their longitudinal directions relative to a housing centrally situated with respect to the wheel and movable with the help of a gear wheel, rotatable in the housing, which engages with the teeth on the bars and which is rotatable by means of an operating mechanism comprising a handle, means for locking the handle to one of the bars, and resilient means acting between the handle and the gear wheel continuously to bias the gripping shoes tightly against the vehicle wheels.

2. A device for fitting and fixing gripping shoes on vehicle wheels, in which four gripping shoes are fitted at the one end of respective bars, which bars, after being fitted onto the wheel, form a cross, and the other ends of which are toothed and are slidably suspended in their longitudinal directions relative to a housing centrally situated with respect to the wheel and movable with the help of a gear wheel, rotatable in the housing, which engages with the teeth on the bars and which is rotatable by means of a resilient element that acts between the gear wheel and one of the bars in a direction continuously to bias the gripping shoes tightly against the vehicle wheels, characterized in that the operating component is in the form of a spring which, from its point of connection with the rotatable part, is in the form of a helical or spiral coil which becomes a tangential part which forms the operating component itself, and the end of which is in the shape of a hook, which after the spring has been tensioned is hooked onto one of the bars.

3. A device for fitting and fixing gripping shoes on vehicle wheels, in which four gripping shoes are fitted at the one end of respective bars, which bars, after being fitted onto the wheel, form a cross, and the other ends of which are toothed and are slidably suspended in their longitudinal directions relative to a housing centrally situated with respect to the wheel and movable with the help of a gear wheel, rotatable in the housing, which engages with the teeth on the bars and which rotatable by means of a resilient element that acts between the gear wheel and one of the bars in a direction continuously to bias the gripping shoes tightly against the vehicle wheels, characterized in that the housing is divided into two parts mutually rotatable about the axis of the gear wheel, each of which carries the toothed parts of two parallel-operated bars, and in that at least one of the parts is fitted with at least one locking device in order to lock the two parts in such a position that the bars form a cross.

4. A device for fitting and fixing gripping shoes on vehicle wheels, in which four gripping shoes are fitted at the one end of respective bars, which bars, after being fitted onto the wheel form a cross, and the other ends of which are toothed and are slidably suspended in their longitudinal directions relative to a housing centrally situated with respect to the wheel and movable with the help of a gear wheel, rotatable in the housing, which engages with the teeth on the bars and which is rotatable by means of an operating component which may be locked to one of the bars with the help of a locking device, wherein a resilient element is fitted between the locking device and the operating component and the operating component is in the form of a spring which, from its point of connection with the rotatable part, is in the form of a helical or spiral coil which becomes a tangential part which forms the operating component itself, and the end of which is in the shape of a hook which, after the spring has been tensioned is hooked onto one of the bars, characterized in that the housing is divided into two parts mutually rotatable about the axis of the gear wheel, each of which carries the toothed parts of two parallel-operated bars, and in that at least one of the parts is fitted with at least one locking device in order to lock the two parts in such a position that the bars form a cross.

5. A device for fitting and fixing gripping shoes on vehicle wheels, in which four gripping shoes are fitted at the one end of respective bars, which bars, after being fitted onto the wheel, form a cross, and the other ends of which are toothed and are slidably suspended in their longitudinal directions relative to a housing centrally situated with respect to the wheel and movable with the help of a gear wheel, rotatable in the housing, which engages with the teeth on the bars and which is rotatable by means of a resilient element that acts between the gear wheel and one of the bars in a direction continuously to bias the gripping shoes tightly against the vehicle wheels, and the housing is divided into two parts mutually rotatable about the axis of the gear wheel, each of which carries the toothed parts of two parallel-operated bars, and in that at least one of the parts is fitted with at least one locking device in order to lock the two parts in such a position that the bars form a cross, characterized in that the one part has two locking devices in the form of lugs with openings through which openings the toothed ends of the parallel-operated bars in the other part are threaded when tensioning the shoes around the wheel with the bars forming a cross.

6. A device for fitting and fixing gripping shoes on vehicle wheels, in which four gripping shoes are fitted at the one end of respective bars, which bars, after being fitted onto the wheel form a cross, and the other ends of which are toothed and are slidably suspended in their longitudinal directions relative to a housing centrally situated with respect to the wheel and movable with the help of a gear wheel, rotatable in the housing, which engages with the teeth on the bars and which is rotatable by means of an operating component which may be locked to one of the bars with the help of a locking device, wherein a resilient element is fitted between the locking device and the operating component, and the operating component is in the form of a spring which, from its point of connection with the rotatable part, is in the form of a helical or spiral coil which becomes a tangential part which forms the operating component itself, and the end of which is in the shape of a hook which, after the spring has been tensioned is hooked onto one of the bars, and the housing is divided into two parts mutually rotatable about the axis of the gear wheel, each of which carries the toothed parts of two parallel-operated bars, and in that at least one of the parts is fitted with at least one locking device in order to lock the two parts in such a position that the bars form a cross, characterized in that the one part has two locking devices in the form of lugs with openings through which openings the toothed ends of the parallel-operated bars in the other part are threaded when tensioning the shoes around the wheel with the bars forming a cross.